(12) United States Patent
Lee et al.

(10) Patent No.: US 11,917,303 B2
(45) Date of Patent: Feb. 27, 2024

(54) CAMERA MODULE

(71) Applicant: LG INNOTEK CO., LTD., Seoul (KR)

(72) Inventors: Gi Seok Lee, Seoul (KR); Min Gyu Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 151 days.

(21) Appl. No.: 17/594,697

(22) PCT Filed: Apr. 24, 2020

(86) PCT No.: PCT/KR2020/005482
§ 371 (c)(1),
(2) Date: Oct. 26, 2021

(87) PCT Pub. No.: WO2020/218898
PCT Pub. Date: Oct. 29, 2020

(65) Prior Publication Data
US 2022/0210312 A1  Jun. 30, 2022

(30) Foreign Application Priority Data

Apr. 26, 2019  (KR) .......................... 10-2019-0049184

(51) Int. Cl.
*H04N 23/74* (2023.01)
*G06V 10/22* (2022.01)
(Continued)

(52) U.S. Cl.
CPC ............. *H04N 23/74* (2023.01); *G06V 10/22* (2022.01); *G06V 20/50* (2022.01); *H04N 5/04* (2013.01); *H04N 23/56* (2023.01); *H04N 23/71* (2023.01)

(58) Field of Classification Search
CPC .......... H04N 23/74; H04N 5/04; H04N 23/56; H04N 23/71; H04N 23/57; H04N 23/60;
(Continued)

(56) References Cited

U.S. PATENT DOCUMENTS

2004/0089791 A1  5/2004  Fujita
2016/0061588 A1  3/2016  Cho et al.
(Continued)

FOREIGN PATENT DOCUMENTS

CN  107637058 A  1/2018
JP  2018-9917 A  1/2018
(Continued)

OTHER PUBLICATIONS

Supplementary European Search Report dated May 4, 2022 in European Application No. 20795354.8.
(Continued)

*Primary Examiner* — Lin Ye
*Assistant Examiner* — Tuan H Le
(74) *Attorney, Agent, or Firm* — Saliwanchik, Lloyd & Eisenschenk

(57) ABSTRACT

A camera module according to an embodiment of the present invention comprises: a light emitting unit which includes a plurality of light emitting areas and drives at least one of the plurality of light emitting areas according to a first control signal so as to output an optical signal; a light receiving unit for collecting the optical signal; a sensor unit which includes a plurality of light receiving areas corresponding to the plurality of light emitting areas, respectively, and drives at least one of the plurality of light receiving areas according to a second control signal to generate an image signal on the basis of the collected light signal; and a control unit which generates at least one of the first control signal and the second control signal on the basis of the image signal and controls at least one of the light emitting unit and the sensor unit on the basis of at least one of the first control signal and the second control signal.

9 Claims, 10 Drawing Sheets

(51) Int. Cl.
  *G06V 20/50* (2022.01)
  *H04N 5/04* (2006.01)
  *H04N 23/56* (2023.01)
  *H04N 23/71* (2023.01)
(58) Field of Classification Search
  CPC ........ H04N 23/61; H04N 23/55; G06V 10/22;
      G06V 20/50; G01S 17/36; G01S 17/894;
      G01S 17/32; G01S 7/4808; G01S 7/4915;
      G01S 7/4916; G01S 17/86; G01S 7/4815;
      G01S 7/484; G01S 17/10; G01S 7/4865;
      G01S 7/4868
  See application file for complete search history.

(56) References Cited

U.S. PATENT DOCUMENTS

| | | |
|---|---|---|
| 2016/0373728 A1 | 12/2016 | Cho et al. |
| 2017/0223337 A1 | 8/2017 | Sung et al. |
| 2018/0048880 A1* | 2/2018 | Trail .................... H04N 13/344 |
| 2018/0359424 A1* | 12/2018 | Shibusawa ............ H04N 23/74 |
| 2019/0095681 A1 | 3/2019 | Lee et al. |

FOREIGN PATENT DOCUMENTS

| | | |
|---|---|---|
| KR | 10-2016-0090464 A | 8/2016 |
| KR | 10-2017-0088259 A | 8/2017 |

OTHER PUBLICATIONS

International Search Report dated Jul. 23, 2020 in International Application No. PCT/KR2020/005482.
Office Action dated Mar. 18, 2023 in Chinese Application No. 202080031635.1.

* cited by examiner

Raw($x_0$)

Raw($x_{90}$)

Raw($x_{180}$)

Raw($x_{270}$)

CAMERA MODULE

CROSS-REFERENCE TO RELATED APPLICATIONS

This application is the U.S. national stage application of International Patent Application No. PCT/KR2020/005482, filed Apr. 24, 2020, which claims the benefit under 35 U.S.C. § 119 of Korean Application No. 10-2019-0049184, filed Apr. 26, 2019, the disclosures of each of which are incorporated herein by reference in their entirety.

TECHNICAL FIELD

Exemplary embodiments relate to a camera module.

BACKGROUND ART

Three-dimensional (3D) content is being applied in many fields such as education, manufacturing, and autonomous driving fields as well as game and culture fields, and a depth map is required to acquire 3D content. The depth map is information that indicates a spatial distance and refers to perspective information of a point with respect to another point in a two-dimensional image.

As methods of acquiring a depth map, a method of projecting infrared (IR) structured light onto an object, a method using a stereo camera, a time-of-flight (ToF) method, and the like are being used. According to the ToF method, a distance to an object is calculated by measuring a flight time, i.e., a time taken for light to be emitted and reflected. The greatest advantage of the ToF method is that distance information about a 3D space is quickly provided in real time. In addition, accurate distance information may be acquired without applying a separate algorithm or performing hardware correction by a user. Furthermore, an accurate depth map may be acquired even when a very close subject is measured or a moving subject is measured.

Accordingly, there is an attempt to use the ToF method for biometric authentication. For example, it is known that a shape of a vein spread into a finger or like does not change throughout life from when a person is a fetus and varies from person to person. Accordingly, a vein pattern can be identified using a camera device having a ToF function. To this end, after fingers are photographed, each finger may be detected by removing a background based on the color and shape of the finger, and a vein pattern of each finger may be extracted from color information of the detected each finger. That is, an average color of the finger, a color of veins distributed in the finger, and a color of wrinkles in the finger may be different from each other. For example, the color of the veins distributed in the finger may have a lighter red color than the average color of the finger, and the color of the wrinkles in the finger may be darker than the average color of the finger. By using such features, a value approximating to a vein for each pixel can be calculated, and a vein pattern can be extracted using the calculated result. An individual can be identified by comparing an extracted vein pattern of each finger with pre-registered data.

When a ToF camera module photographs a close object as in face recognition or vein recognition, an intensity of reflected light may be strong, and thus, pixels of an image sensor may be saturated. The pixels saturated as described above are regarded as dead pixels during image processing, and thus, a null value is set. Accordingly, an empty space is generated in the saturated pixel, which causes the degradation of image quality. In addition, in a ToF camera module which outputs an optical signal at a constant light intensity irrespective of distance, there is a problem in that power consumption is greatly increased.

DISCLOSURE

Technical Problem

The present invention is directed to providing a camera module capable of photographing an object at a short distance.

The present invention is directed to providing a camera module with high power consumption efficiency.

The object of the embodiments is not limited to the aforesaid and includes objects or effects that may be recognized from technical solutions or exemplary embodiments described hereinafter.

Technical Solution

According to an embodiment of the present invention, a camera module includes a light-emitting unit which includes a plurality of light-emitting areas and outputs an optical signal by driving at least one of the plurality of light-emitting areas according to a first control signal, a light-receiving unit configured to receive the optical signal, a sensor unit which includes a plurality of light-receiving areas corresponding to the plurality of light-emitting areas and generates an image signal based on the received optical signal by driving at least one of the plurality of light-receiving areas according to a second control signal, and a control unit which generates at least one of the first control signal and the second control signal based on the image signal and controls at least one of the light-emitting unit and the sensor unit based on at least one of the first control signal and the second control signal.

The control unit may generate the first control signal for controlling the light-emitting unit to sequentially drive the plurality of light-emitting areas.

The control unit may generate the first control signal for controlling the light-emitting unit to simultaneously drive a plurality of areas among the plurality of light-emitting areas.

The control unit may synchronize and generate the first control signal and the second control signal and may generate the second control signal for controlling the sensor unit to drive the light-receiving areas corresponding to the light-emitting areas driven according to the first control signal.

The camera module may further include an image processing unit configured to generate an image based on the image signal.

When the image generated in a first sequence includes a pixel having a value that is greater than or equal to a preset threshold, the control unit may generate the first control signal for controlling an intensity of an optical signal output by the light-emitting unit in a second sequence to be less than an intensity of an optical signal in the first sequence.

The control unit may generate the first control signal based on an object detection area in which an object is detected in the image generated in a first sequence.

The control unit may generate the first control signal for controlling the sensor unit to drive at least one of the plurality of light-emitting areas corresponding to the object detection area in a second sequence.

The light-emitting unit may includes a plurality of light-emitting elements of which at least one is disposed in the plurality of light-emitting areas to generate the optical signal, and an optical element which is disposed apart from the light-emitting element and scatters and outputs the optical signal.

The optical element may have at least one surface formed as a spherical surface having a predetermined curvature.

Advantageous Effects

According to embodiments, it is possible to provide a high-quality image during short distance photographing.

According to embodiments, the power consumption efficiency of a camera module can be increased, and the camera module can be miniaturized.

The various and advantageous advantages and effects of the present invention are not limited to the above description and may be more easily understood in the course of describing specific exemplary embodiments of the present invention.

MODES OF THE INVENTION

Hereinafter, exemplary embodiments of the present invention will be described in detail with reference to the accompanying drawings.

However, the technical spirit of the present invention is not limited to some exemplary embodiments disclosed below but can be implemented in various different forms. Without departing from the technical spirit of the present invention, one or more of components may be selectively combined and substituted to be mutually used in the exemplary embodiments.

Also, unless defined otherwise, terms (including technical and scientific terms) used herein may be interpreted as having the same meaning as commonly understood by one of ordinary skill in the art to which the present invention belongs. General terms like those defined in a dictionary may be interpreted in consideration of the contextual meaning of the related technology.

Furthermore, the terms used herein are intended to illustrate exemplary embodiments but are not intended to limit the present invention.

In the present specification, the terms expressed in the singular form may include the plural form unless otherwise specified. When "at least one (or one or more) of A, B, and C" is expressed, it may include one or more of all possible combinations of A, B, and C.

In addition, terms such as "first," "second," "A," "B," "(a)," and "(b)" may be used herein to describe components of the exemplary embodiments of the present invention.

Each of the terms is not used to define an essence, order, or sequence of a corresponding component but used merely to distinguish the corresponding component from other components.

In a case in which one component is described as being "connected," "coupled," or "joined" to another component, such a description may include both a case in which one component is "connected," "coupled," and "joined" directly to another component and a case in which one component is "connected," "coupled," and "joined" to another component with still another component disposed between one component and another component.

In addition, in a case in which any one component is described as being formed or disposed "on (or under)" another component, such a description includes both a case in which the two components are formed to be in direct contact with each other and a case in which the two components are in indirect contact with each other such that one or more other components are interposed between the two components. In addition, in a case in which one component is described as being formed "on (or under)" another component, such a description may include a case in which the one component is formed at an upper side or a lower side with respect to another component.

Figure 1:
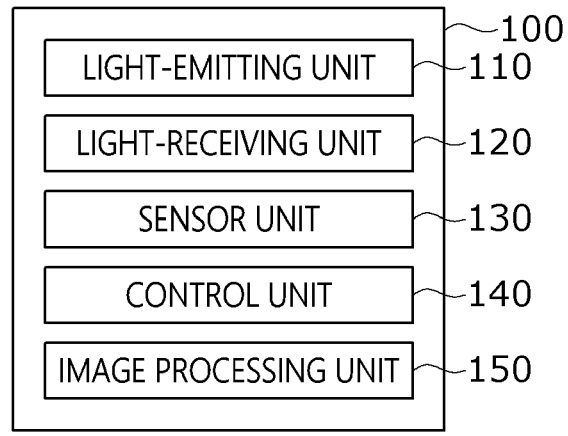
FIG. 1 is a block diagram of a camera module according to an exemplary embodiment of the present invention.

FIG. 1 is a block diagram of a camera module according to an exemplary embodiment of the present invention.

A camera module 100 according to the exemplary embodiment of the present invention may be referred to as a camera device, a time-of-flight (ToF) camera module, a ToF camera device, or the like.

The camera module 100 according to the exemplary embodiment of the present invention may be included in an optical device. The optical device may include any one of a cellular phone, a mobile phone, a smartphone, a portable smart device, a digital camera, a laptop computer, a digital broadcasting terminal, a personal digital assistant (PDA), a portable multimedia player (PMP), and a navigation device. However, types of the optical device are not limited thereto, and any device for capturing an image or video may be included in the optical device.

Referring to FIG. 1, the camera module 100 according to the exemplary embodiment of the present invention may include a light-emitting unit 110, a light-receiving unit, a sensor unit 130, and a control unit 140 and may further include an image processing unit 150.

The light-emitting unit 110 may include a plurality of light-emitting areas and may output an optical signal by driving at least one of the plurality of light-emitting areas according to a first control signal.

The light-emitting unit 110 may be a light-emitting module, a light-emitting unit, a light-emitting assembly, or a light-emitting device. The light-emitting unit 110 may generate and output an optical signal, that is, emit the generated optical signal, to an object. In this case, the light-emitting unit 110 may generate and output the optical signal in the form of a pulse wave or a continuous wave. The continuous wave may be in the form of a sinusoid wave or a squared wave. In the present specification, the optical signal output by the light-emitting unit 110 may refer to an optical signal incident on an object. The optical signal output by the light-emitting unit 110 may be referred to as output light, an output light signal, or the like with respect to the camera module 100. Light output by the light-emitting unit 110 may be referred to as incident light, an incident light signal, or the like with respect to an object.

The light-emitting unit 110 may output, that is, emit light, to an object for a predetermined integration time. Here, the integration time may refer to one frame period, that is, one image frame period. When a plurality of frames are generated, a set integration time is repeated. For example, when the camera module 100 photographs an object at 20 frames per second (FPS), an integration time is ½₀ [sec]. When 100 frames are generated, an integration time may be repeated 100 times.

The light-emitting unit 110 may output a plurality of optical signals having different frequencies. The light-emitting unit 110 may sequentially and repeatedly output a plurality of optical signals having different frequencies. Alternatively, the light-emitting unit 110 may simultaneously output a plurality of optical signals having different frequencies.

The light-receiving unit 120 may be a light-receiving module, a light-receiving unit, a light-receiving assembly, or a light-receiving device. The light-receiving unit 120 may receive an optical signal that is output from the light-emitting unit 110 and reflected from an object. The light-receiving unit 120 may be disposed side by side with the light-emitting unit 110. The light-receiving unit 120 may be disposed adjacent to the light-emitting unit 110. The light-receiving unit 120 may be disposed in the same direction as the light-emitting unit 110. The light-receiving unit 120 may include a filter for allowing an optical signal reflected from an object to pass therethrough.

In the present specification, an optical signal received by the light-receiving unit 120 may refer to an optical signal reflected from an object after the optical signal output from the light-emitting unit 110 reaches the object. The optical signal received by the light-receiving unit 120 may be referred to as input light, an input light signal, or the like with respect to the camera module 100. Light output by the light-receiving unit 120 may be referred to as reflected light, a reflected light signal, or the like from an object.

The sensor unit 130 may include a plurality of light-receiving areas corresponding to the plurality of light-emitting areas. The sensor unit 130 may generate an image signal based on a received optical signal by driving at least one of the plurality of light-receiving areas according to a second control signal. That is, the sensor unit 130 may sense the optical signal received by the light-receiving unit 120. The sensor unit 130 may be an image sensor that senses an optical signal. The sensor unit 130 may be used interchangeably with a sensor, an image sensor, an image sensor unit, a ToF sensor, a ToF image sensor, or a ToF image sensor unit.

The sensor unit 130 may generate an electrical signal by detecting light. That is, the sensor unit 130 may generate an electrical signal through the optical signal received by the light-receiving unit 120. The generated electrical signal may be an analog type. The sensor unit 130 may generate an image signal based on the generated electrical signal and may transmit the generated image signal to the image processing unit 150. In this case, the image signal may be an electrical signal that is an analog type or a signal obtained by digitally converting an electrical signal that is an analog type. When an electrical signal that is an analog type is transmitted as an image signal, the image processing unit 150 may digitally convert the electrical signal through a device such as an analog-to-digital converter (ADC).

The sensor unit 130 may detect light having a wavelength corresponding to a wavelength of light output from the light-emitting unit 110. For example, the sensor unit 130 may detect infrared light. Alternatively, the sensor unit 130 may detect visible light.

The sensor unit 130 may be a complementary metal oxide semiconductor (CMOS) image sensor or a charge coupled device (CCD) image sensor. In addition, the sensor unit 130 may include a ToF sensor which receives an infrared optical signal reflected from a subject and then measures a distance using a time or phase difference.

The control unit 140 may generate at least one of the first control signal and the second control signal based on an image signal. The control unit 140 may control at least one of the light-emitting unit 110 and the sensor unit 130 based on at least one of the first control signal and the second control signal.

The control unit 140 may generate the first control signal for controlling the light-emitting unit to sequentially drive the plurality of light-emitting areas. The control unit 140 may generate the first control signal for controlling the light-emitting unit to simultaneously drive the plurality of areas among the plurality of light-emitting areas. The control unit 140 may synchronize and generate the first control signal and the second control signal. The control unit 140 may generate the second control signal for controlling the sensor unit 130 to drive the light-receiving area corresponding to the light-emitting area driven according to the first control signal.

The control unit 140 may generate the first control signal and the second control signal based on an image generated by the image processing unit. When an image generated in a first sequence includes a pixel having a value that is greater than or equal to a preset threshold, the control unit 140 may generate the first control signal for controlling an intensity of an optical signal output by the light-emitting unit 110 in a second sequence to be less than an intensity of an optical signal output in the first sequence by the light-emitting unit 110. In addition, the control unit 140 may generate the first control signal based on an object detection area in which an object is detected in the image generated in the first sequence. The control unit 140 may generate the first control signal for driving at least one of the plurality of light-emitting areas corresponding to the object detection area in the second sequence.

Here, the first sequence and the second sequence may refer to a driving sequence of the camera module 100. The second sequence may refer to a sequence driven before the first sequence. The first sequence may refer to a sequence for performing at least one of light saturation area detection and object detection, and the second sequence may refer to a sequence for photographing an object according to a result of the first sequence.

The image processing unit 150 may receive an image signal from the sensor unit 130 and may process the image signal (for example, perform digital conversion, interpolation, or frame synthesis thereon) to generate an image.

The image processing unit 150 may generate an image based on an image signal. In this case, the image may include a plurality of pixels, and the plurality of pixels may include a first pixel having a value that is less than a preset threshold and a second pixel having a value that is greater than or equal to the preset threshold. The first pixel may refer to a pixel having a valid value, and the second pixel may refer to a pixel having an invalid value, that is, a null value.

The image processing unit 150 may include a processor which processes an image signal to generate an image. The processor may be implemented as a plurality of processors according to functions of the image processing unit 150, and some of the plurality of processors may be implemented in combination with the sensor unit 130. For example, a processor which converts an electrical signal that is an analog type into an image signal that is a digital type may be implemented in combination with a sensor. As another example, the plurality of processors included in the image processing unit 150 may be implemented separately from the sensor unit 130.

Figure 2:
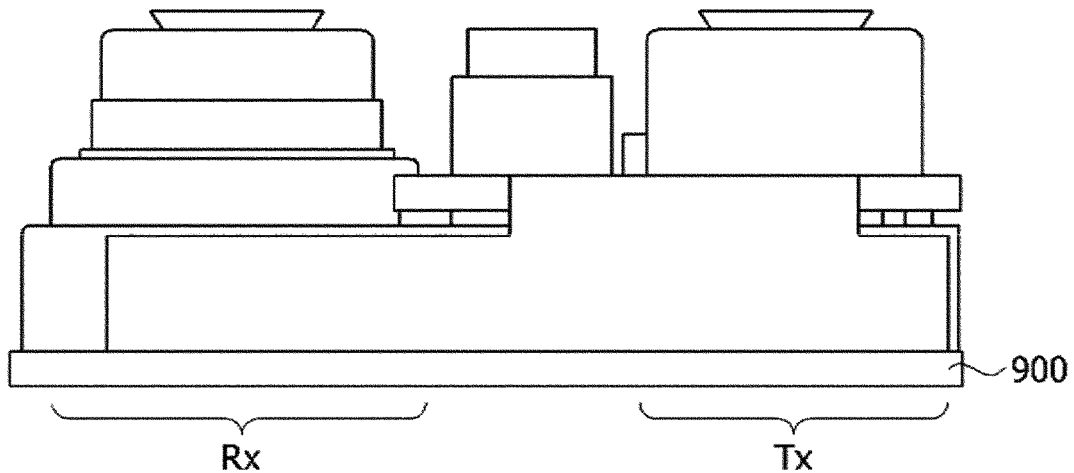
FIG. 2 is a side view of a camera module according to an exemplary embodiment of the present invention.

FIG. 2 is a side view of a camera module according to an exemplary embodiment of the present invention.

Referring to FIG. 2, the camera module 100 according to the exemplary embodiment of the present invention may include a transmitting side Tx which includes a light-emitting unit 110 and outputs an optical signal and a receiving side Rx which includes a light-receiving unit 120 and a sensor unit 130 and receives the optical signal. Although not shown in FIG. 2, the camera module 100 according to the exemplary embodiment of the present invention may further include a control unit 140 which controls at least one of the light-emitting unit 110, the light-receiving unit 120, and the sensor unit 130.

Referring to FIG. 2, the sensor unit 130 may be disposed on a printed circuit board 200, and the control unit 140 may be implemented in the printed circuit board 200. The transmitting side Tx, that is, the light-emitting unit 110, may be disposed on a side surface of the receiving side Rx on the printed circuit board 200. An image processing unit 150 may be implemented in the printed circuit board 200 or may be implemented outside the printed circuit board 200.

Figure 3:
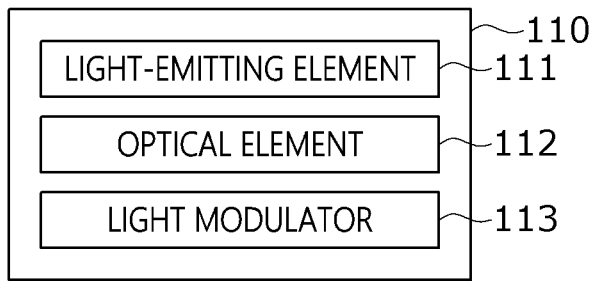
FIG. 3 is a block diagram of a light-emitting unit according to an exemplary embodiment of the present invention.

FIG. 3 is a block diagram of a light-emitting unit according to an exemplary embodiment of the present invention.

As described above, the light-emitting unit 110 may refer to a component which generates an optical signal and then outputs the generated optical signal to an object. In order to implement such a function, the light-emitting unit 110 may include a light-emitting element 111 and an optical element 112 and may further include a light modulator 113.

First, the light-emitting element 111 may refer to an element which receives electricity to generate light (ray). Light generated by the light-emitting element 111 may be infrared light having a wavelength of 770 nm to 3,000 nm. Alternatively, the light generated by the light-emitting element 111 may be visible light having a wavelength of 380 nm to 770 nm.

The light-emitting element 111 may include a light-emitting diode (LED). In addition, the light-emitting element 111 may include an organic light-emitting diode (OLED) or a laser diode (LD).

The light-emitting element 111 may be implemented in a form arranged according to a predetermined pattern. Accordingly, the light-emitting element 111 may be provided as a plurality of light-emitting elements. The plurality of light-emitting elements 111 may be arranged along rows and columns on a substrate. The plurality of light-emitting elements 111 arranged according to the predetermined pattern may be divided into a plurality of light-emitting areas including at least one light-emitting element 111. For example, a plurality of light-emitting areas including one light-emitting element 111 may be implemented. As another example, a plurality of light-emitting areas including two or more light-emitting elements 111 may be implemented. In each light-emitting area, an intensity of generated light, a duty ratio, or the like may be independently controlled.

The plurality of light-emitting elements 111 may be mounted on the substrate. The substrate may be a printed circuit board (PCB) on which a circuit pattern is formed. The substrate may be implemented as a flexible printed circuit board (FPCB) in order to secure predetermined flexibility. In addition, the substrate may be implemented as any one of a resin-based PCB, a metal core PCB, a ceramic PCB, and an FR-4 board. Furthermore, the plurality of light-emitting elements 111 may be implemented in the form of a chip.

The optical element 112 may scatter and output an input optical signal according to a predetermined scattering pattern. The optical element 112 may scatter light to improve luminance uniformity of an optical signal generated from the light-emitting element 111 and simultaneously remove a hot spot at which the light-emitting element 111 is positioned and light is concentrated. That is, the optical element 112 may scatter an input optical signal to uniformly spread an output optical signal over an entire surface.

The optical element 112 is disposed on a front surface of the light-emitting element 111. In this case, the front surface of the light-emitting element 111 refers to one surface positioned in a direction in which an optical signal is output from the light-emitting element 111. The optical element 112 may be disposed to be spaced apart from the light-emitting element 111 by a predetermined distance. A distance between the optical element 112 and the light-emitting element 111 may be designed by those skilled in the art in consideration of the purpose of the camera module, the shape and type of the light-emitting element 111, and the like.

The optical element 112 may be implemented as an optical diffuser. The optical element 112 may have a configuration in which a diffusing agent for scattering light is mixed with a transparent material capable of transmitting light. That is, the diffusing agent included in the optical element 112 may scatter incident light to remove hot spots. In this case, the transparent material may be polycarbonate.

At least one surface of the optical element 112 may be implemented as a spherical surface having a predetermined curvature.

The light modulator 113 may control turn-on/off of the light-emitting element 111 and control the light-emitting element 111 to generate an optical signal in the form of a continuous wave or a pulse wave. The light modulator 113 may control the light-emitting element 111 to generate light in the form of a continuous wave or a pulse wave through frequency modulation, pulse modulation, or the like. For example, the light modulator 113 may repeat turn-on/off of the light-emitting element 111 at a predetermined time interval and control the light-emitting element 111 to generate light in the form of a pulse wave or a continuous wave. The predetermined time interval may be a frequency of an optical signal.

Figure 4:
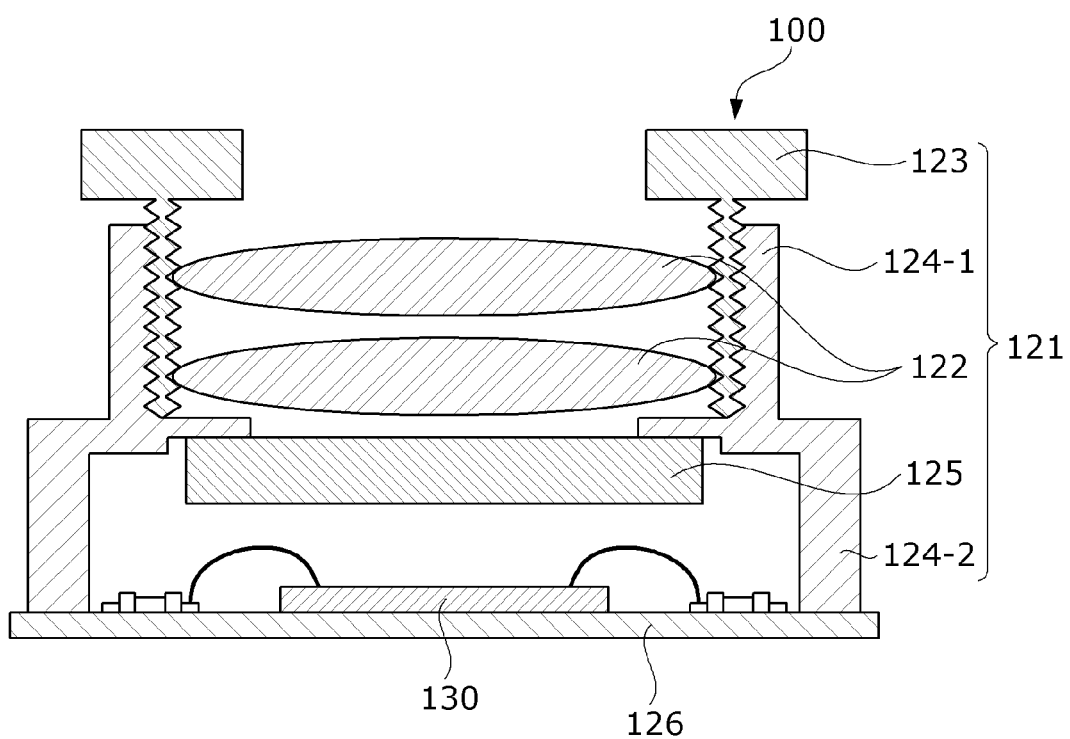
FIG. 4 is a view for describing a light-receiving unit according to an exemplary embodiment of the present invention.

FIG. 4 is a view for describing a light-receiving unit according to an exemplary embodiment of the present invention.

Referring to FIG. 4, the light-receiving unit 120 includes a lens assembly 121 and a filter 125. The lens assembly 121 may include a lens 122, a lens barrel 123, and a lens holder 124.

The lens 122 may be provided as a plurality of lenses or provided as one lens. The lens 122 may include the above-described variable lens. When the lens 122 is provided as the plurality of lenses, respective lenses may be arranged with respect to a central axis thereof to form an optical system. Here, the central axis may be the same as an optical axis of the optical system.

The lens barrel 123 is coupled to the lens holder 124, and a space for accommodating the lens may be formed therein. Although the lens barrel 123 may be rotationally coupled to the one lens or the plurality of lenses, this is merely an example, and the lens barrel 123 may be coupled through other methods such as a method using an adhesive (for example, an adhesive resin such as an epoxy).

The lens holder 124 may be coupled to the lens barrel 123 to support the lens barrel 123 and coupled to a PCB 126 on which a sensor unit 130 is mounted. Here, a sensor may correspond to the sensor unit 130 of FIG. 1. A space in which the filter 125 can be attached may be formed under the lens barrel 123 due to the lens holder 124. A spiral pattern may be formed on an inner circumferential surface of the lens holder 124, and the lens holder 124 may be rotatably coupled to the lens barrel 123 in which a spiral pattern is similarly formed on an outer circumferential surface thereof. However, this is merely an example, and the lens holder 124 and the lens barrel 123 may be coupled through an adhesive, or the lens holder 124 and the lens barrel 123 may be integrally formed.

The lens holder 124 may be divided into an upper holder 124-1 coupled to the lens barrel 123 and a lower holder 124-2 coupled to the PCB 126 on which the sensor unit 130 is mounted. The upper holder 124-1 and the lower holder 124-2 may be integrally formed, may be formed in separate structures and then connected or coupled, or may have structures that are separate and spaced apart from each other. In this case, a diameter of the upper holder 124-1 may be less than a diameter of the lower holder 124-2.

The filter 125 may be coupled to the lens holder 124. The filter 125 may be disposed between the lens assembly 121 and the sensor. The filter 125 may be disposed on a light path between an object and the sensor. The filter 125 may filter light in a predetermined wavelength range. The filter 125 may allow light having a specific wavelength to pass therethrough. That is, the filter 125 may reflect or absorb light other than a specific wavelength to block the light. The filter 125 may allow infrared light to pass therethrough and block light having a wavelength other than infrared light. Alternatively, the filter 125 may allow visible light to pass therethrough and block light having a wavelength other than visible light. The filter 125 may be moved. The filter 125 may be moved integrally with the lens holder 124. The filter 125 may be tilted. The filter 125 may be moved to adjust an optical path. The filter 125 may be moved to change a path of light incident to the sensor unit 130. The filter 125 may change an angle or a direction of a field of view (FOV) of incident light.

Although not shown in FIG. 4, an image processing unit 150 and the like may be implemented in the PCB. The light-emitting unit 110 of FIG. 1 may be disposed on a side surface of the sensor unit 130 on the PCB 126 or disposed outside a camera module 100, for example, on a side surface of the camera module 100.

The above example is merely one exemplary embodiment, and the light-receiving unit 120 may have another structure capable of receiving light incident to the camera module 100 and transmitting the light to the sensor.

Figure 5:
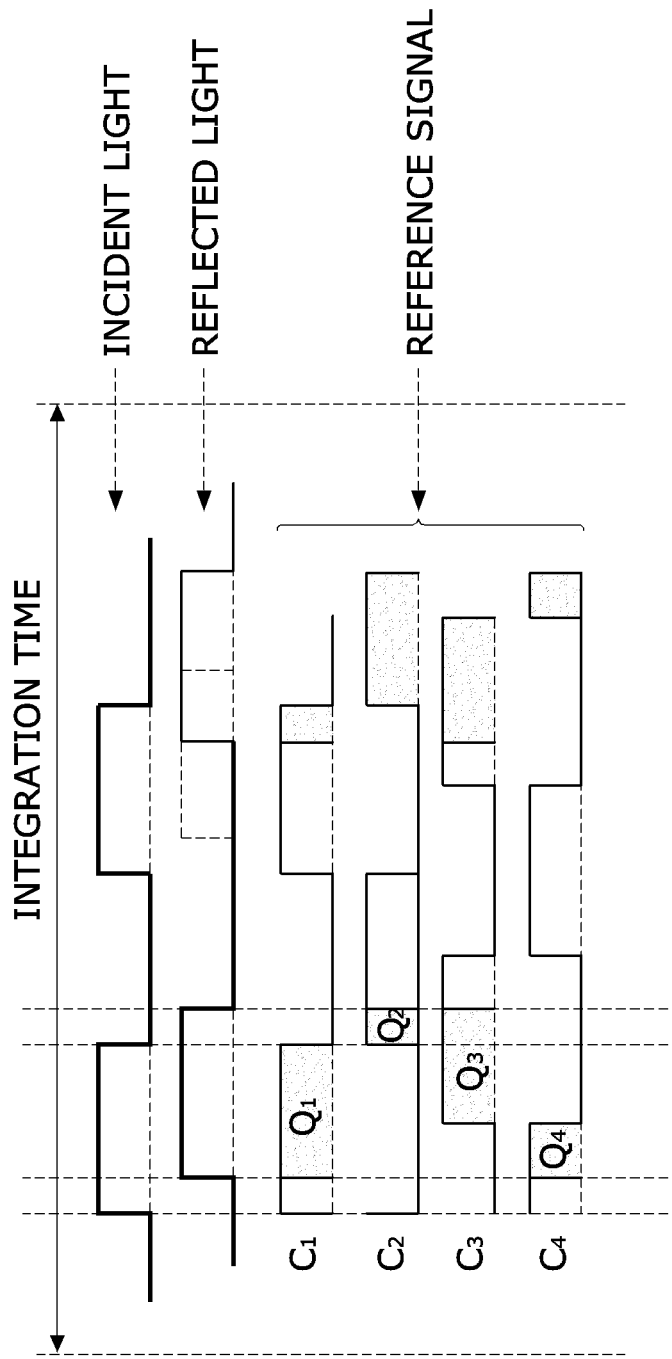
FIG. 5 is a diagram for describing a process of generating an electrical signal according to an exemplary embodiment of the present invention.

FIG. 5 is a diagram for describing a process of generating an electrical signal according to an exemplary embodiment of the present invention.

As shown in FIG. 5, there may be reference signals, that is, four demodulated signals $C_1$ to $C_4$, according to an exemplary embodiment of the present invention. The demodulated signals $C_1$ to $C_4$ may each have the same frequency as output light (light output from a light-emitting unit 110), that is, incident light from the point of view of an object and may mutually have a phase difference of 90°. One demodulated signal $C_1$ of the four demodulated signals may have the same phase as the output light. A phase of input light (light received by a light-receiving unit 120), that is, reflected light from the point of view of the object, is delayed by as much as a distance by which the output light is reflected to return after being incident on the object. A sensor unit 130 mixes the input light and each demodulated signal. Then, the sensor unit 130 may generate an electrical signal corresponding to a shaded portion of FIG. 5 for each demodulated signal. The electrical signal generated for each demodulated signal may be transmitted to an image processing unit 150 as an image signal, or a digitally converted electrical signal may be transmitted to the image processing unit 150 as an image signal.

In another embodiment, when pieces of output light are generated at a plurality of frequencies during an integration time, a sensor absorbs pieces of input light at the plurality of frequencies. For example, it is assumed that the pieces of output light are generated at frequencies $f_1$ and $f_2$, and a plurality of demodulated signals have a phase difference of 90°. Then, since pieces of incident light also have frequencies $f_1$ and $f_2$, four electrical signals may be generated through the input light having the frequency $f_1$ and four demodulated signals corresponding thereto. Four electrical signals may be generated through the input light having the frequency $f_2$ and four demodulated signals corresponding thereto. Accordingly, a total of eight electrical signals may be generated.

Figure 6:
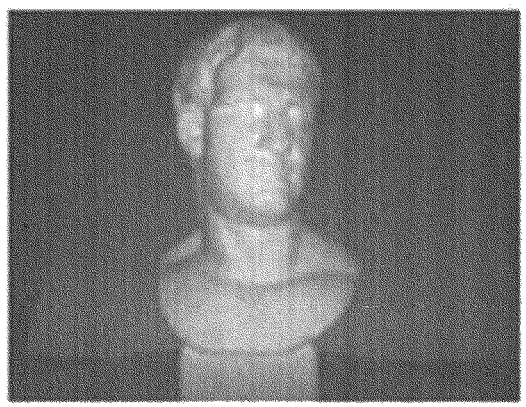
FIG. 6 is a diagram for describing a sub-frame image according to an exemplary embodiment of the present invention.
Figure 6:
Figure 6:
Figure 6:

FIG. 6 is a diagram for describing a sub-frame image according to an exemplary embodiment of the present invention.

As described above, an electrical signal may be generated so as to correspond to a phase for each of four demodulated signals. Accordingly, as shown in FIG. 6, an image processing unit 150 may acquire sub-frame images corresponding to four phases. Here, the four phases may be 0°, 90°, 180°, and 270°, and the sub-frame image may be used interchangeably with a phase image, a phase IR image, and the like.

The image processing unit 150 may generate a depth image based on the plurality of sub-frame images.

Figure 7A:
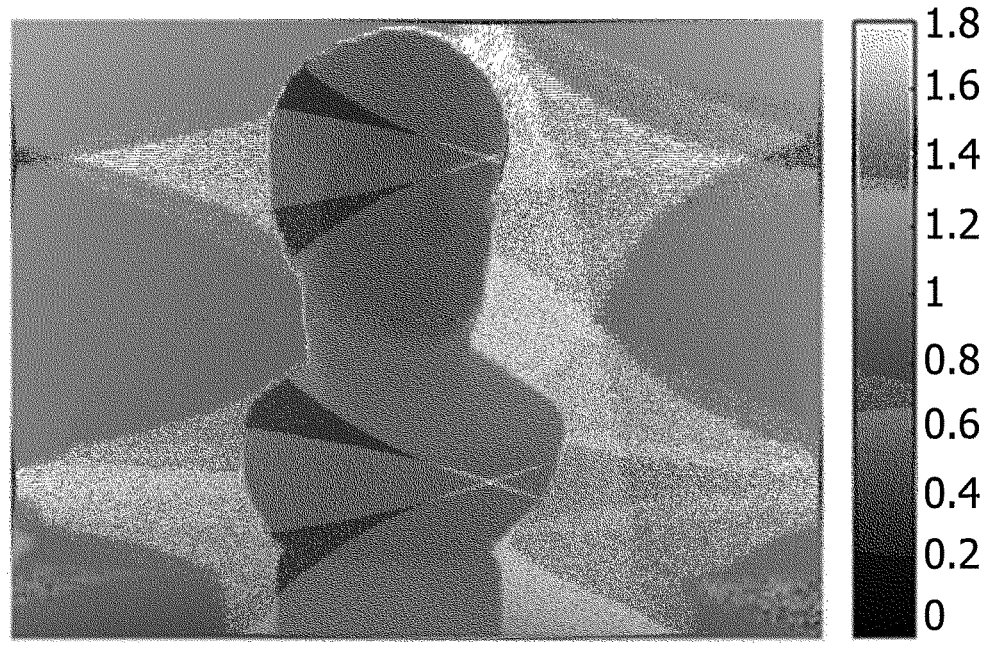
FIGS. 7A and 7B are diagrams for describing a depth image according to an exemplary embodiment of the present invention.
Figure 7B:
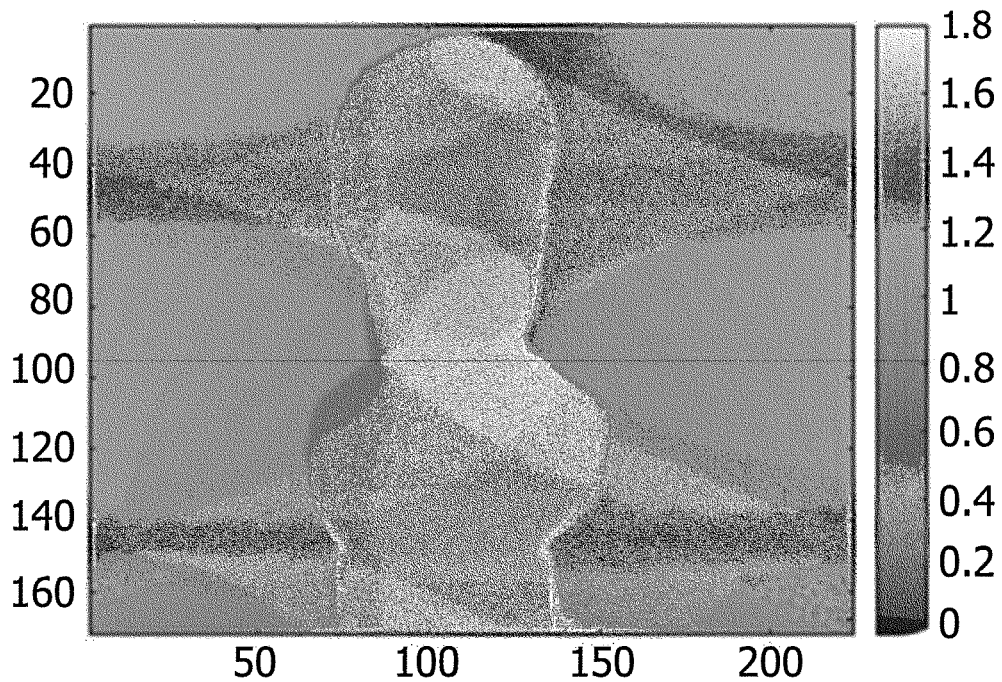

FIGS. 7A and 7B are diagrams for describing a depth image according to an exemplary embodiment of the present invention.

The depth image of FIGS. 7A and 7B represent an image generated based on the sub-frame images of FIG. 4. An image processing unit 150 may generate a depth image using a plurality of sub-frame images, and the depth image may be implemented through Equations 1 and 2 below.

$$\text{Phase} = \arctan\left(\frac{\text{Raw}(x_{90}) - \text{Raw}(x_{270})}{\text{Raw}(x_{180}) - \text{Raw}(x_0)}\right) \quad \text{[Equation 1]}$$

Here, $Raw(x_0)$ denotes a sub-frame image corresponding to a phase of 0°. $Raw(x_{90})$ denotes a sub-frame image corresponding to a phase of 90°. $Raw(x_{180})$ denotes a sub-frame image corresponding to a phase of 180°. $Raw(x_{270})$ denotes a sub-frame image corresponding to a phase of 270°.

That is, the image processing unit 150 may calculate a phase difference between an optical signal output by a light-emitting unit 110 and an optical signal received by a light-receiving unit 120 for each pixel through Equation 1.

$$Depth = \frac{1}{2f} c \frac{Phase}{2\pi} \quad \text{[Equation 2]}$$

(c = speed of light)

Here, f denotes a frequency of an optical signal. c denotes the speed of light.

That is, the image processing unit 150 may calculate a distance between a camera module 100 and an object for each pixel through Equation 2.

Meanwhile, the image processing unit 150 may also generate a ToF IR image based on the plurality of sub-frame images.

Figure 8:
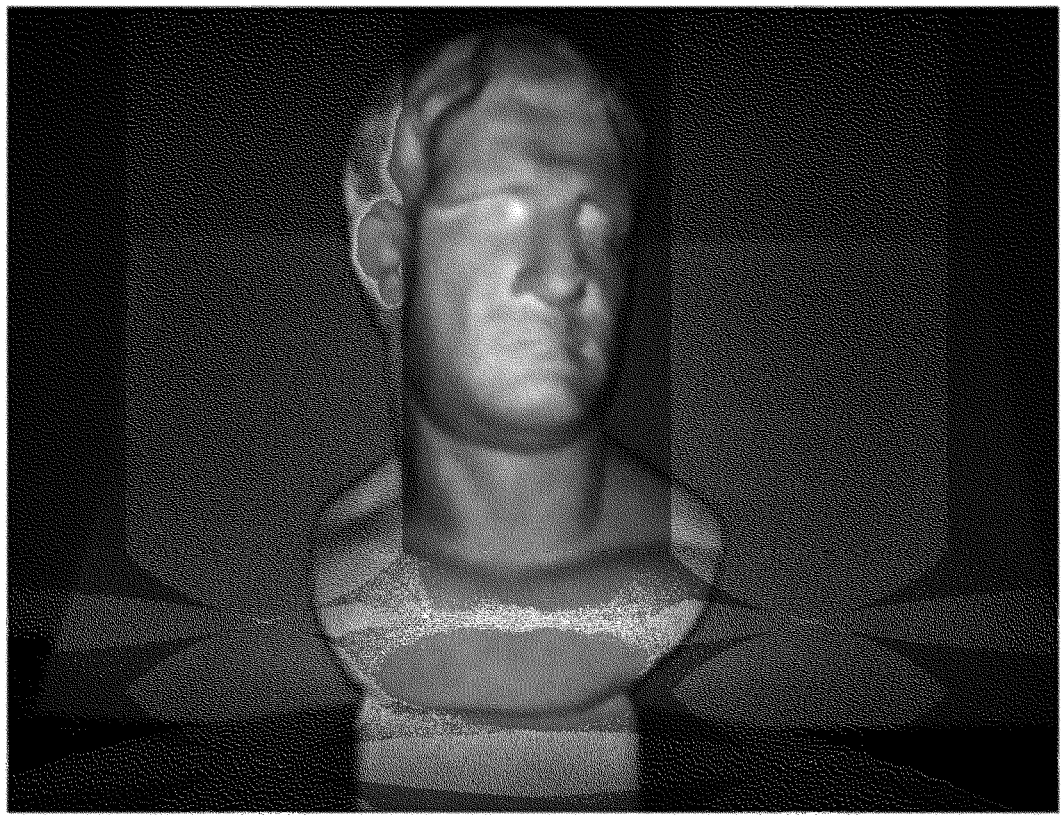
FIG. 8 is a diagram for describing a time-of-flight (ToF) infrared (IR) image according to an exemplary embodiment of the present invention.

FIG. 8 is a diagram for describing a ToF IR image according to an exemplary embodiment of the present invention.

FIG. 8 shows an amplitude image which is a type of ToF IR image generated through the four sub-frame images of FIG. 4.

In order to generate the amplitude image as shown in FIG. 8, an image processing unit 150 may use Equation 3 below.

$$Amplitude = \frac{1}{2}\sqrt{(Raw(x_{90}) - Raw(x_{270}))^2 - (Raw(x_{180}) - Raw(x_0))^2} \quad \text{[Equation 3]}$$

As another example, the image processing unit 150 may generate an intensity image, which is a type of ToF IR image, using Equation 4 below. The intensity image may be used interchangeably with a confidence image.

$$Intensity = |Raw(x_{90}) - Raw(x_{270})| - |Raw(x_{180}) - Raw(x_0)| \quad \text{[Equation 4]}$$

The ToF IR image such as the amplitude image or the intensity image may be a gray image.

Figure 9A:
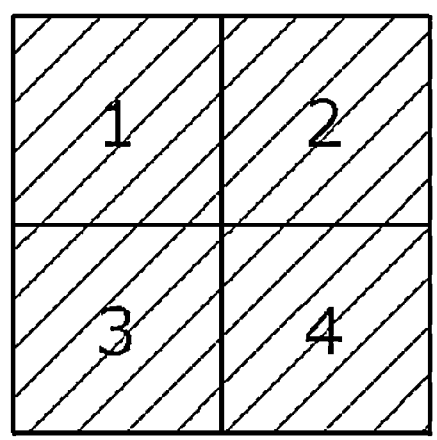
FIGS. 9A-9C show diagrams for describing a method of driving light-emitting areas of a light-emitting unit according to an exemplary embodiment of the present invention.
Figure 9B:
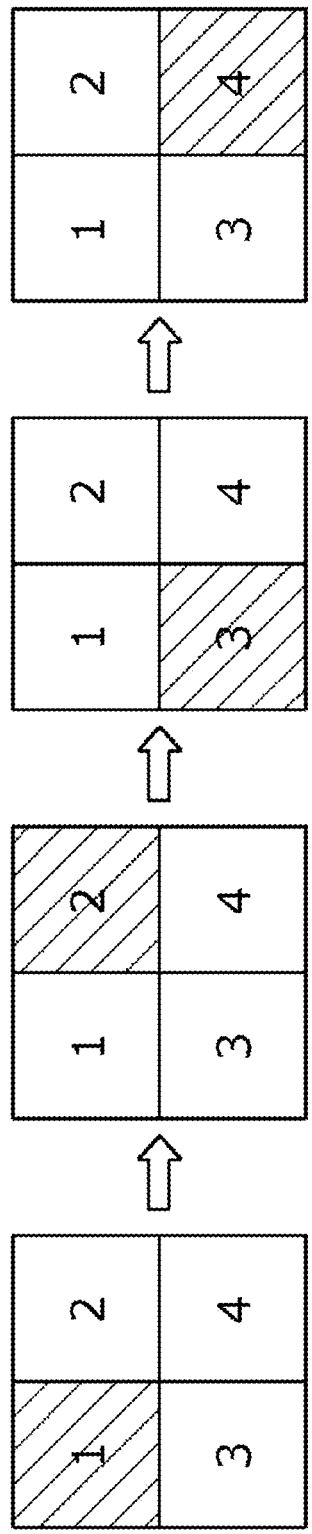
Figure 9C:
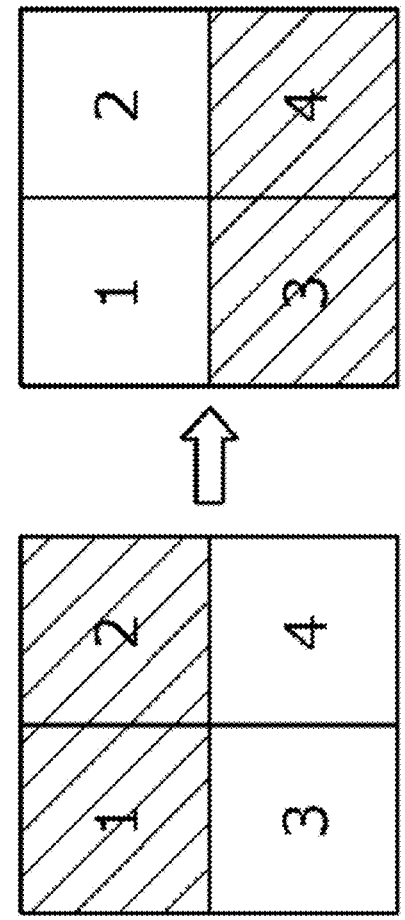

FIGS. 9A-9C show diagrams for describing a method of driving light-emitting areas of a light-emitting unit according to an exemplary embodiment of the present invention.

As shown in FIGS. 9A-9C, it is assumed that a plurality of light-emitting elements included in a light-emitting unit 110 are divided into four light-emitting areas.

Referring to FIG. 9A, the light-emitting unit 110 may simultaneously drive all of the light-emitting areas. In response, a sensor unit 130 may also simultaneously drive all of light-receiving areas.

Referring to FIG. 9B, the light-emitting unit 110 may sequentially drive the light-emitting areas. The light-emitting unit 110 may sequentially drive four light-emitting areas, that is, light-emitting areas 1 to 4. In this case, the sensor unit 130 may also sequentially drive the light-receiving areas corresponding to the driven light-emitting areas.

Referring to FIG. 9C, the light-emitting unit 110 may simultaneously drive a plurality of areas among the plurality of light-emitting areas. For example, the light-emitting unit 110 may simultaneously drive light-emitting areas 1 and 2 and simultaneously drive light-emitting areas 3 and 4. The light-emitting unit 110 may simultaneously drive light-emitting areas 1 and 2 and then simultaneously drive light-emitting areas 3 and 4. In this case, the sensor unit 130 may simultaneously drive the plurality of light-receiving areas corresponding to the driven light-emitting areas. Although not shown in FIGS. 9A-9C, the light-emitting areas do not need to be simultaneously driven to have an equal size, and after light-emitting areas 1 to 3 are simultaneously driven, light-emitting area 4 may be driven.

Figure 10A:
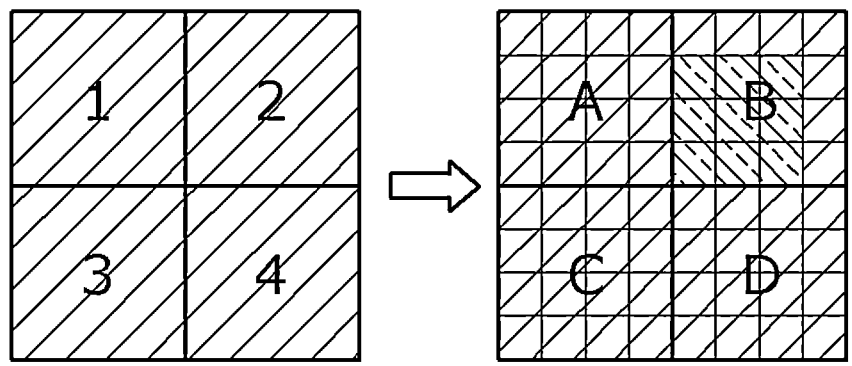
FIGS. 10A and 10B show diagrams for describing a first example according to an exemplary embodiment of the present invention.
Figure 10B:
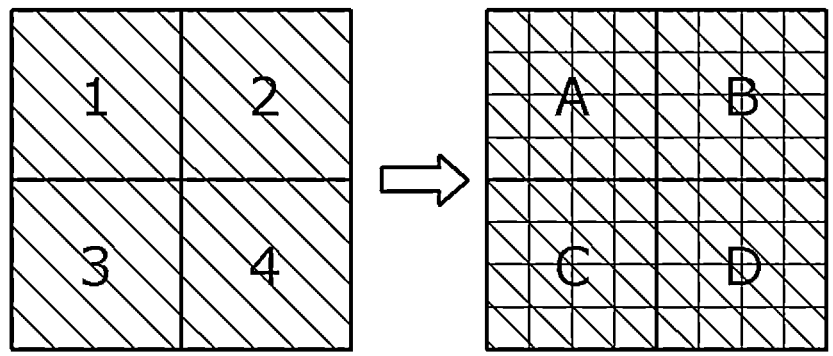

FIGS. 10A and 10B show diagrams for describing a first example according to an exemplary embodiment of the present invention.

FIG. 10A is a diagram for describing an operation in a first sequence, and FIG. 10B is a diagram for describing an operation in a second sequence. The left side of FIGS. 10A and 10B shows a light-emitting unit 110, and the right side thereof shows a sensor unit 130.

As shown in FIGS. 10A and 10B, it is assumed that a plurality of light-emitting elements included in the light-emitting unit 110 are divided into four light-emitting areas and four light-receiving areas included in the sensor unit 130 are also divided to correspond to the light-emitting areas. That is, light-emitting area 1 corresponds to a light-receiving area A, a light-emitting area 2 corresponds to a light-receiving area B, light-emitting area 3 corresponds to a light-receiving area C, and light-emitting area 4 corresponds to a light-receiving area D.

First, referring to FIG. 10A, a control unit 140 may control the light-emitting unit 110 to output an optical signal through all of four light-emitting areas in response to a first control signal according to the first sequence. In addition, the control unit 140 may control the sensor unit 130 to receive the optical signal through all of four light-receiving areas in response to a second control signal synchronized to the first control signal according to the first sequence.

Then, the sensor unit 130 generates an image signal through the received optical signal, and an image processing unit 150 generates an image through the image signal. In this case, the image may be a depth image and may also be an IR image.

The control unit 140 may search for an area in which light saturation occurs based on an image or an image signal generated in the first sequence. For example, on the basis of the image, the control unit 140 may determine a pixel area of the image, in which a null value occurs as a pixel value, as an area in which light saturation occurs. As another example, on the basis of the image signal, the control unit 140 may determine a pixel area of the sensor unit 130, in which the image signal is output with a value that is greater than or equal to a preset threshold, as an area in which light saturation occurs. Referring to FIG. 10A, it is assumed that light saturation occurs in some pixels (hatched portions) of the light-receiving area B.

Next, referring to FIG. 10B, the control unit 140 may control the light-emitting unit 110 to output an optical signal through four light-emitting areas in response to the first control signal according to the second sequence. In addition, the control unit 140 may control the sensor unit 130 to receive the optical signal through all of four light-receiving areas in response to the second control signal synchronized to the first control signal according to the second sequence.

In this case, in the second sequence, the light-emitting unit 110 may be controlled by the first control signal to output an optical signal having an intensity that is less than an intensity of an optical signal output in the first sequence from the light-emitting unit 110. For example, when an intensity of an optical signal is 10 in the first sequence, the light-emitting unit 110 may be controlled to output an optical signal having an intensity of 5 in the second sequence.

Then, the sensor unit 130 generates an image signal through the received optical signal, and the image processing unit 150 generates an image through the image signal. In the second sequence, due to a reduction in intensity of an optical signal, light saturation may not occur as shown in FIG. 10B, and image precision can be improved.

Figure 11A:
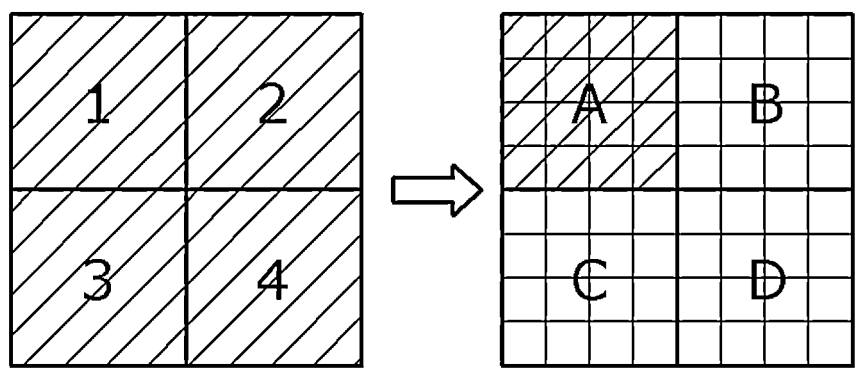
FIGS. 11A-11C show diagrams for describing a second example according to an exemplary embodiment of the present invention.
Figure 11B:
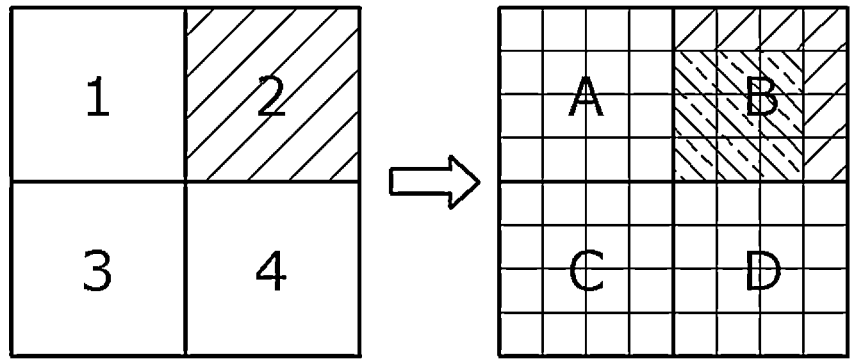
Figure 11C:
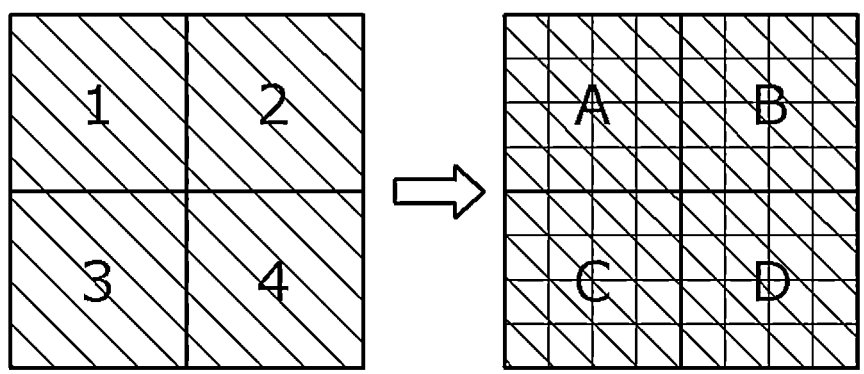

FIGS. 11A-11C show diagrams for describing a second example according to an exemplary embodiment of the present invention.

Referring to FIGS. 11A-11C, a light-emitting unit 110 may sequentially drive light-emitting areas 1 to 4 in a first sequence, and in response, a sensor unit 130 may also sequentially drive light-receiving areas A to D in the first sequence.

First, as shown in FIG. 11A, in the first sequence, the light-emitting unit 110 may drive light-emitting area 1, and the sensor unit 130 may drive the light-receiving area A to generate an image signal. A control unit 140 may determine whether light saturation has occurred in the light-receiving area A based on the image signal.

When it is determined that light saturation has not occurred in the light-receiving area A, as shown in FIG. 11B, the light-emitting unit 110 may drive light-emitting area 2, and the sensor unit 130 may drive the light-receiving area B to generate an image signal. The control unit 140 may determine whether light saturation has occurred in the light-receiving area B based on the image signal.

As shown in FIG. 11B, since light saturation has occurred in some pixels (hatched portions) of the light-receiving area B, a camera module 100 may stop the first sequence (driving according to light-emitting areas 3 and 4 is not performed) to perform a second sequence.

The control unit 140 may control the light-emitting unit 110 to output an optical signal through four light-emitting areas in response to a first control signal according to the second sequence. In addition, the control unit 140 may control the sensor unit 130 to receive the optical signal through all of four light-receiving areas in response to a second control signal synchronized to the first control signal according to the second sequence. In this case, in the second sequence, the light-emitting unit 110 may be controlled by the first control signal to output an optical signal having an intensity that is less than an intensity of an optical signal output in the first sequence from the light-emitting unit 110.

In this case, since driving of light-emitting areas 3 and 4 and the light-receiving areas C and D is not performed, power can be saved.

Figure 12A:
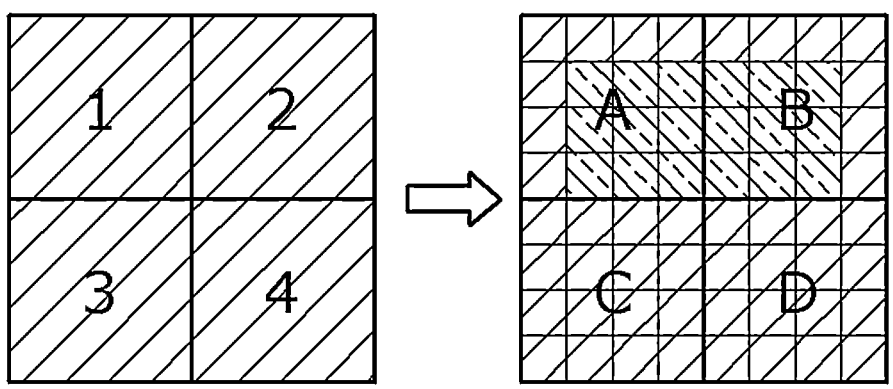
FIGS. 12A and 12B show diagrams for describing a third example according to an exemplary embodiment of the present invention.
Figure 12B:
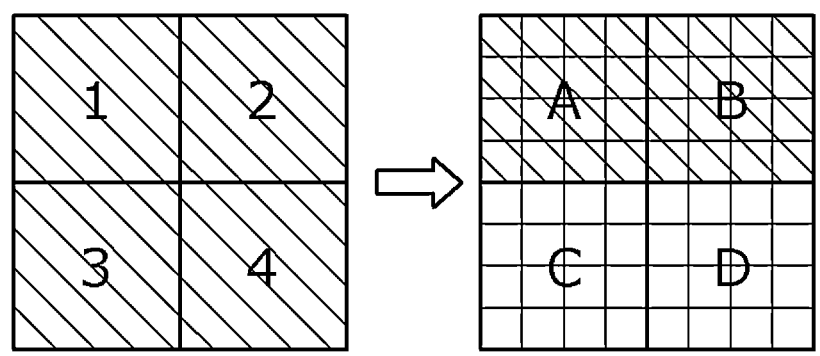

FIGS. 12A and 12B show diagrams for describing a third example according to an exemplary embodiment of the present invention.

First, referring to FIG. 10A, a control unit 140 may control a light-emitting unit 110 to output an optical signal through all of four light-emitting areas in response to a first control signal according to a first sequence. In addition, the control unit 140 may control a sensor unit 130 to receive the optical signal through all of four light-receiving areas in response to a second control signal synchronized to the first control signal according to the first sequence. In this case, as described above, the light-emitting areas may also be partially or sequentially driven.

Then, the sensor unit 130 generates an image signal through the received optical signal, and an image processing unit 150 generates an image through the image signal. In this case, the image may be a depth image and may also be an IR image.

The control unit 140 may search for an area in which light saturation occurs based on an image or an image signal generated in the first sequence. For example, on the basis of the image, the control unit 140 may determine a pixel area of the image, in which a null value occurs as a pixel value (an area in which light saturation occurs), as an object detection area. As another example, on the basis of the image, the control unit 140 may determine a pixel area of the image, which has a pixel value that is greater than or equal to a specific value, as an object detection area. As another example, on the basis of the image signal, the control unit 140 may determine a pixel area of the sensor unit 130, in which the image signal is output with a value that is greater than or equal to a preset threshold, as an object detection area. Referring to FIG. 12A, it can be seen that an object is detected in some pixels (hatched portions) of light-receiving areas A and B.

Then, the control unit 140 may control the light-emitting unit 110 to output an optical signal through a light-emitting area corresponding to the object detection area in response to the first control signal according to a second sequence. In addition, the control unit 140 may control the sensor unit 130 to receive the optical signal through a light-receiving area corresponding to the object detection area in response to the second control signal synchronized to the first control signal according to the second sequence. When light saturation occurs, the control unit 140 may generate the first control signal to control an intensity of an optical signal in the second sequence to be output less than an intensity of an optical signal in the first sequence.

In this case, there is an advantage in that a function of a proximity sensor can be performed using low power.

The present invention has been described based on the exemplary embodiments, but the exemplary embodiments are for illustrative purposes and do not limit the present invention, and those skilled in the art will appreciate that various modifications and applications, which are not exemplified in the above description, may be made without departing from the scope of the essential characteristic of the present exemplary embodiments. For example, each component described in detail in the exemplary embodiment can be modified. Further, the differences related to the modification and the application should be construed as being included in the scope of the present invention defined in the appended claims.

The invention claimed is:

1. A camera module comprising:
   a light-emitting unit that includes a plurality of light-emitting areas and outputs an optical signal by driving at least one of the plurality of light-emitting areas according to a first control signal;
   a light-receiving unit configured to receive the optical signal;
   a sensor unit that includes a plurality of light-receiving areas corresponding to the plurality of light-emitting areas, respectively, and generates an image signal based on the received optical signal by driving at least one of the plurality of light-receiving areas according to a second control signal;
   a control unit that generates at least one of the first control signal and the second control signal based on the image signal and controls at least one of the light-emitting unit and the sensor unit based on at least one of the first control signal and the second control signal; and an image processing unit configured to generate an image based on the image signal, wherein the control unit is configured to generate at least one of the first control signal and the second control signal for a second sequence based on the image generated by the image processing unit in a first sequence, and wherein the first sequence is a sequence for light saturation area detection, and the second sequence is a sequence for photographing an object according to a result of the first sequence.

2. The camera module of claim 1, wherein the control unit generates the first control signal for controlling the light-emitting unit to sequentially drive the plurality of light-emitting areas.

3. The camera module of claim 1, wherein the control unit generates the first control signal for controlling the light-emitting unit to simultaneously drive a plurality of areas among the plurality of light-emitting areas.

4. The camera module of claim 1, wherein the control unit synchronizes and generates the first control signal and the second control signal and generates the second control signal for controlling the sensor unit to drive the light-receiving areas corresponding to the light-emitting areas driven according to the first control signal.

5. The camera module of claim 1, wherein, when the image generated in the first sequence includes a pixel having a value that is greater than or equal to a preset threshold, the control unit generates the first control signal for controlling an intensity of an optical signal output by the light-emitting unit in the second sequence to be less than an intensity of an optical signal in the first sequence.

6. The camera module of claim 1, wherein the control unit generates the first control signal based on an object detection area in which an object is detected in the image generated in the first sequence.

7. The camera module of claim 6, wherein the control unit generates the first control signal for controlling the sensor unit to drive at least one of the plurality of light-emitting areas corresponding to the object detection area in the second sequence.

8. The camera module of claim 1, wherein the light-emitting unit includes:

a plurality of light-emitting elements of which at least one is disposed in the plurality of light-emitting areas to generate the optical signal; and an optical element that is disposed apart from the light-emitting element and scatters and outputs the optical signal.

9. The camera module of claim 8, wherein the optical element has at least one surface formed as a spherical surface having a predetermined curvature.

* * * * *